(12) United States Patent
Dias et al.

(10) Patent No.: US 8,140,666 B2
(45) Date of Patent: Mar. 20, 2012

(54) METHOD AND APPARATUS FOR NETWORK DISTRIBUTION AND PROVISIONING OF APPLICATIONS ACROSS MULTIPLE DOMAINS

(75) Inventors: Daniel Manuel Dias, Mohegan Lake, NY (US); Dilip Dinkar Kandlur, San Jose, CA (US); James Thomas Rayfield, Ridgefield, CT (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 11/693,349

(22) Filed: Mar. 29, 2007

(65) Prior Publication Data
US 2008/0240150 A1 Oct. 2, 2008

(51) Int. Cl.
 *H04J 3/22* (2006.01)
(52) U.S. Cl. ........ 709/224; 709/238; 709/241; 709/242; 709/223; 370/465; 370/252; 370/401; 370/351
(58) Field of Classification Search .......... 709/238, 709/241, 242, 223, 224; 370/465, 252, 401, 370/351
See application file for complete search history.

(56) References Cited

U.S. PATENT DOCUMENTS

| | | | |
|---|---|---|---|
| 6,681,232 B1 | 1/2004 | Sistanizadeh et al. | |
| 7,020,697 B1 | 3/2006 | Goodman et al. | |
| 7,054,943 B1 * | 5/2006 | Goldszmidt et al. | 709/229 |
| 7,120,694 B2 * | 10/2006 | Sinha | 709/228 |
| 7,222,190 B2 * | 5/2007 | Klinker et al. | 709/238 |
| 7,269,157 B2 * | 9/2007 | Klinker et al. | 370/351 |
| 7,574,502 B2 * | 8/2009 | Clymer et al. | 709/224 |

(Continued)

FOREIGN PATENT DOCUMENTS

JP 2002319970 10/2002

(Continued)

OTHER PUBLICATIONS

V.K. Naik et al., "Adaptive Resource Sharing in a Web Services Environment," Middleware Conference, 2004, pp. 311-330, vol. 78, LNCS 3231.

(Continued)

*Primary Examiner* — Quang N. Nguyen
*Assistant Examiner* — Kostas Katsikis
(74) *Attorney, Agent, or Firm* — Louis J. Percello; Ryan, Mason & Lewis, LLP (57) ABSTRACT

Techniques are disclosed for network distribution and provisioning of applications, such as transactional applications and parallel applications, across multiple administrative domains that ensure compliance with service level agreements. For example, a method of provisioning one or more resources in a distributed computing network to ensure compliance with a service level agreement associated with a computer application includes the following steps. Network performance is monitored between a local domain and one or more cooperating domains connected to the local domain by network paths. A present or predicted violation of the service level agreement is identified based on at least a portion of results of the monitoring step. One or more cooperating domains are selected that can effect compliance with the service level agreement by instantiating one or more network resources within at least one of the selected cooperating domains in response to a request from the local domain. Reconfiguration of the local domain is effectuated to allow the computer application to make use of the one or more newly instantiated network resources within the selected cooperating domain.

15 Claims, 5 Drawing Sheets

U.S. PATENT DOCUMENTS

| | | | |
|---|---|---|---|
| 7,584,298 B2 * | 9/2009 | Klinker et al. | 709/238 |
| 2002/0039352 A1 * | 4/2002 | El-Fekih et al. | 370/252 |
| 2002/0099669 A1 | 7/2002 | Lauer | |
| 2002/0145981 A1 * | 10/2002 | Klinker et al. | 370/244 |
| 2002/0178383 A1 * | 11/2002 | Hrabik et al. | 713/201 |
| 2003/0069950 A1 * | 4/2003 | Gieseke | 709/221 |
| 2003/0217245 A1 * | 11/2003 | Chase et al. | 711/170 |
| 2005/0165925 A1 * | 7/2005 | Dan et al. | 709/224 |
| 2005/0257256 A1 * | 11/2005 | Supnik et al. | 726/11 |
| 2007/0294399 A1 * | 12/2007 | Grossner et al. | 709/224 |

FOREIGN PATENT DOCUMENTS

| | | |
|---|---|---|
| WO | WO 0384133 A1 * | 10/2003 |

OTHER PUBLICATIONS

Y. Liu et al., "QoS Computation and Policing in Dynamic Web Service Selection," ACM, May 2004, pp. 66-73, New York.

Z. Liu et al., "On Maximizing Service-Level-Agreement Profits," ACM, Oct. 2001, pp. 213-223, vol. 29, Issue 3, Florida.

* cited by examiner

METHOD AND APPARATUS FOR NETWORK DISTRIBUTION AND PROVISIONING OF APPLICATIONS ACROSS MULTIPLE DOMAINS

FIELD OF THE INVENTION

The present invention generally relates to distributed computing networks and service level agreement compliance and, more particularly, to techniques for network distribution and provisioning of transactional and parallel applications across multiple domains.

BACKGROUND OF THE INVENTION

It is known that a provider of a computing system service will typically utilize a server cluster (a computing system with multiple servers) to host one or more applications. It is also known that organizations such as corporations will also utilize a server cluster to run one or more applications. Such computing systems that host/run such applications may be collocated or distributed across a network, e.g., the Internet or an intranet.

By way of example, a server cluster may host a so-called "transactional application." An example of a transactional application may be a stock trading application wherein the application is executed across multiple servers that are used to process client requests (e.g., stock trade transactions). Another example of a financial transaction-based application may be a banking application. In the case of a transactional application, a dispatch router typically controls the flow of the client requests to the individual servers of the server cluster.

A server cluster may also host a so-called "parallel application." An example of a parallel application is a computationally-intensive scientific or mathematical application wherein the application is executed across multiple servers that are used to process client requests (e.g., portions of a computation-based scientific research or mathematical project). Another example of a parallel application may be a data mining application. In the case of a parallel application, a scheduler typically controls the flow of the client requests to the individual servers of the server cluster.

It is known that computing systems that host/run such applications may be distributed across a network (e.g., the Internet or an intranet) in accordance with a so-called "grid" distribution approach. As is known, a grid is a type of parallel and distributed system that is separated into multiple administrative domains, wherein each domain may have a distinct and separate set of administrative policies by which its resources operate. Organizations may typically utilize multiple independently-operated administrative domains that reside at geographically distributed sites. However, conventional computing system service approaches are typically formulated to use only server resources in a single administrative domain, and thus do not address issues involving multiple administrative domains.

Furthermore, conventional computing system service approaches typically fail to adequately ensure compliance with the contractual terms agreed upon between the owner of the application and the service provider hosting the application. Such terms are typically set forth in a so-called "service level agreement" (SLA).

Still further, conventional computing system service approaches typically focus only on distributed allocation of server resources (i.e., the computing resources themselves) and thus fail to take into account network resource issues. Network resource issues may include, for example, issues relating to network elements such as local area networks (LAN) with switches, firewalls, virtual LANs (VLANs), and connectivity to wide area networks (WAN) with services such as virtual private networks (VPNs), route control, and quality-of-service. That is, besides computational resources (server resources), compliance with an SLA may hinge on network resource issues. This is not addressed by conventional computing system service approaches.

Accordingly, there is a need for techniques that provide network distribution and provisioning of applications, such as transactional applications and parallel applications, across multiple administrative domains that ensure compliance with SLAs.

SUMMARY OF THE INVENTION

Principles of the present invention provide techniques for network distribution and provisioning of applications, such as transactional applications and parallel applications, across multiple administrative domains that ensure compliance with service level agreements.

For example, in one aspect of the invention, a method of provisioning one or more resources in a distributed computing network to ensure compliance with a service level agreement associated with a computer application includes the following steps. Network performance is monitored between a local domain and one or more cooperating domains connected to the local domain by network paths. A present or predicted violation of the service level agreement is identified based on at least a portion of results of the monitoring step. One or more cooperating domains are selected that can effect compliance with the service level agreement by instantiating one or more network resources within at least one of the selected cooperating domains in response to a request from the local domain. Reconfiguration of the local domain is effectuated to allow the computer application to make use of the one or more newly instantiated network resources within the selected cooperating domain.

The network performance monitoring step may further include collecting information relating to at least one of a latency characteristic and a bandwidth characteristic associated with one of more of the network paths. The cooperating domain selection step may further include querying one or more of the cooperating domains to determine one or more available network resources. The local domain reconfiguring step may further include affecting one or more of a local area network configuration change, a firewall rule change, and an access bandwidth change. The local domain reconfiguring step may also include instructing a request router to direct one or more client requests to the selected cooperating domain. The computer application may be one of a transactional application and a parallel application. The local domain and the one or more cooperating domains may include distributed grid sites in a grid-based distributed computing network.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention provide techniques for network distribution and provisioning of applications, such as transactional applications and parallel applications, across multiple administrative domains that ensure compliance with service level agreements (SLAs).

As used herein, it is to be appreciated that the term "domain" refers to an environment and associated computational and network resources that are owned and/or managed by a particular organization. Some examples of administrative domains include a network-connected grid site that is run by a university or research lab, or a branch office belonging to a large enterprise, with its own servers and Internet connectivity. Another definition applicable to "domain" refers to autonomous systems (ASes) in the Internet, which are independently managed by service providers. Leveraging resources across domains typically requires some communication and coordination (e.g., through agreed-upon protocols) that allow different organizations to negotiate resource usage.

Further, as used herein, it is to be appreciated that the phrase "computational resource" (or "computing resources") refers to resources that are used primarily to run applications, including for example, computer servers and storage. The phrase "network resources," as used herein, refers to entities that enable communication between computational resources across a LAN or WAN, such as switches, firewalls, and routers. This would also include auxiliary network functions such as domain name servers.

While principles of the invention are not intended to be limited to a particular network environment, an exemplary network environment in which such principles may be implemented is one described in U.S. Patent Application Publication No. 2005/0165925, filed Jan. 22, 2004 and entitled "System and Method for Supporting Transaction and Parallel Services Across Multiple Domains Based on Service Level Agreements," the disclosure of which is incorporated by reference herein.

In the exemplary environment described in U.S. Patent Application Publication No. 2005/0165925, an on-demand manager enables multiple administrative (service) domains to provide computational resources (i.e., server resources) to support transactional and parallel workloads with associated SLA guarantees on metrics such as application throughput or response time. The computational resources include servers organized in clusters and behind a workload dispatcher which directs transaction requests to an appropriate server, or a parallel task scheduler which schedules tasks on servers.

More particularly, U.S. Patent Application Publication No. 2005/0165925 describes a network with multiple domains, i.e., a local domain and a plurality of remote domains. Each domain includes an on-demand manager and a server cluster. The local domain and the remote domains define and support a set of service level agreements corresponding to a mixture of transactional and parallel services across multiple domains. Clients invoke these services by making requests to a domain such as the local domain. The local domain and the remote domains are assigned a set of workloads that represent requests from different sets of clients and workload types, each with a service level agreement. For example, the local domain and the remote domains may have a transactional workload type as well as a parallel workload type. Other workload classes may be defined. For example, within each workload type there may be multiple client types. These client types may include different service level agreements representing various levels of performance guarantees.

Further, the on-demand manager described in U.S. Patent Application Publication No. 2005/0165925 is responsible for monitoring the workloads associated with the service level agreements and may optionally predict future workload. If the on-demand manager detects a violation of a service level agreement, the on-demand manager reconfigures the server resources of the local domain to ensure that it does not remain in a detected violation state or enter a predicted violation state. The on-demand manager addresses the situation where local server resources are insufficient for demands by clients.

The on-demand manager described in U.S. Patent Application Publication No. 2005/0165925 may include a service level agreement monitor and an executor module. The on-demand manager optionally includes a prediction model that determines whether any of the monitored service level agreements that are being violated may be violated in the future. The service level agreement monitor is given information about each of its set of workloads through one or more data providers. The data providers give information about the current state of the workloads with respect to the service level agreements. A planner module determines what changes to the current system configuration are needed to properly deal with actual or predicted violations of the service level agreements. The executor module uses the computed plan to reconfigure the system to best handle the current or predicted load.

Still further, as described in U.S. Patent Application Publication No. 2005/0165925, if violations of the service level agreements cannot be handled by locally reconfiguring the server resources of the local domain, a remote resource manager module in the local on-demand manager issues a request for the needed server resources to one or more of the remote domains. The request includes the service level agreements that are being or may be violated and a proposed monetary value. The remote domains analyze commitments to their own service level agreements in addition to current and projected loads. Based on this analysis, the remote domains may accept the request for server resources, reject the request, or counter-propose an offer of server resources and corresponding service level agreements. The remote resource manager in the local domain examines the responses, chooses one or more acceptances or counter-proposals, and confirms or rejects the offers from the remote domains. Once server resources are thus acquired, the executor module reconfigures the enhanced server resource set to move some of its workload from server resources in the local domain to server resources in the selected remote domain.

Thus, while U.S. Patent Application Publication No. 2005/0165925 describes a technique for allocating server resources across multiple domains based on whether the current or predicted workloads meet the specified SLA, such allocation across domains does not consider the need for network-aware allocation and the provisioning of network resources (as opposed to server resources) at the remote domain in order to maintain SLA conformance.

Accordingly, principles of the invention improve upon the previous allocation and provisioning model by taking into consideration the management of applications running across multiple administrative domains, interconnected by a network, and with additional SLA requirements related to network performance, reliability, and other like metrics.

Principles of the invention realize that many transactional and parallel applications have performance and availability requirements that are dependent on network resources, and thus network resources must be considered when allocating application tasks to multiple distributed sites. For example, parallel applications (e.g., computation-intensive scientific or financial applications) are often divided into subtasks that progress asynchronously on different computation servers, which may be distributed across multiple geographic sites. These subtasks may need to communicate information between one another to synchronize periodically, or to gather additional data for the next phase of the computation. The communication requirements in such applications are unaddressed by the current state of the art. In standard web-based or peer-to-peer transactional applications, the main concern with regard to network requirements is usually to direct clients to nearby servers (in terms of network delay). This does not account for the need to query the network configuration and provision network resources at the remote site, for example, in distributed grid-like infrastructures.

In addition, when server resources are spread across multiple, geographically distributed sites, client requests are directed to the appropriate site according to the decision of the SLA monitor. This requires a request router that can be dynamically updated to direct clients to the correct site. Finally, in order to determine the network performance between sites where subtasks are operating, or clients are directed, it is necessary to collect and expose network statistics about important metrics such as bandwidth, delay, loss. Principles of the invention also provide a network monitoring component to perform this function.

Figure 1A:
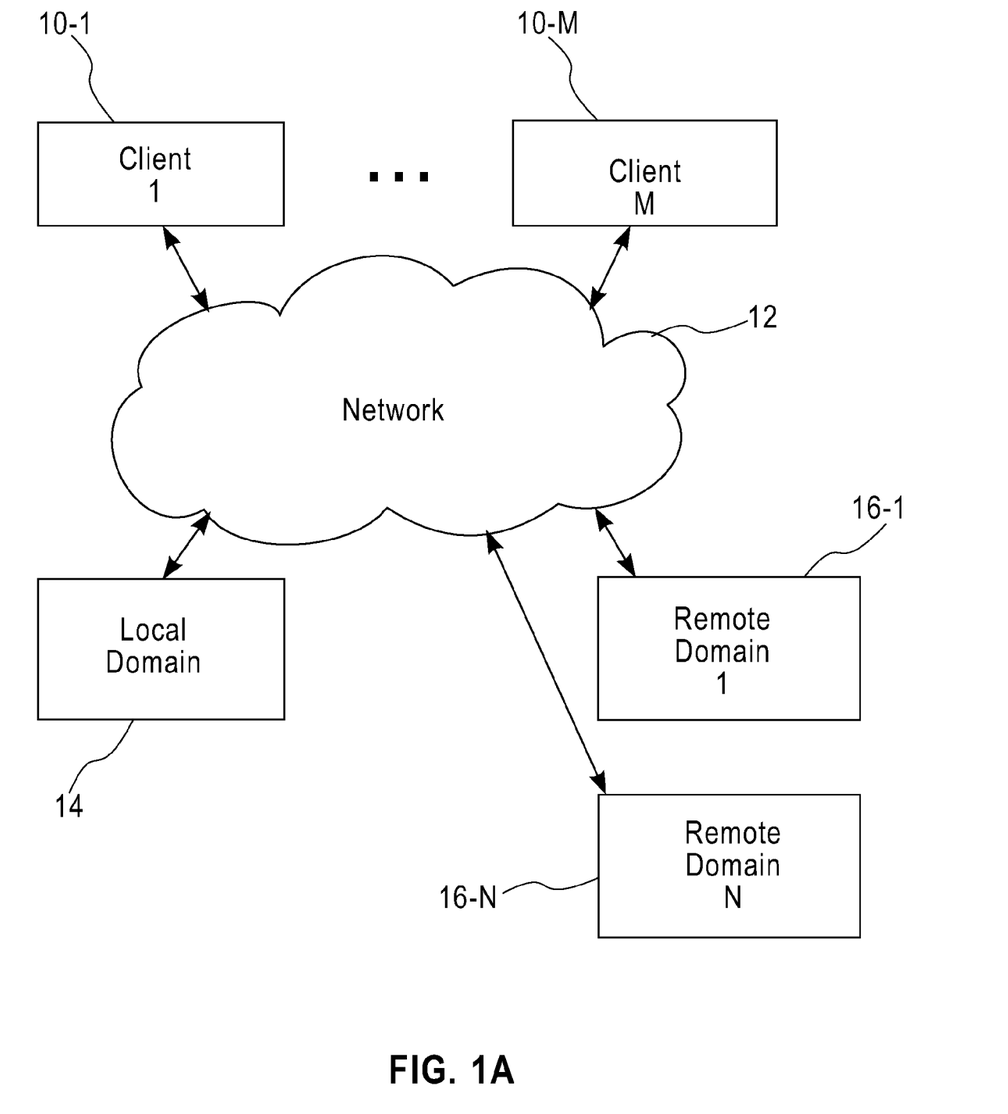
FIG. 1A illustrates an exemplary distributed network environment in which principles of the invention may be implemented.

Accordingly, as generally depicted in the exemplary environment of FIG. 1A, principles of the invention may be implemented in a distributed network environment wherein clients 10-1 through 10-M send application requests through network 12 to a local administrative domain 14 which is in communication with one or more remote administrative domains 16-1 through 16-N via network 12. It is to be understood that the determination of whether a domain is a local domain or a remote domain is dependent on one or more criterion, e.g., location of the client with respect to the domain, how the application is distributed, etc. It is also to be understood that each domain may represent a grid site in a grid-based distributed network.

Figure 1B:
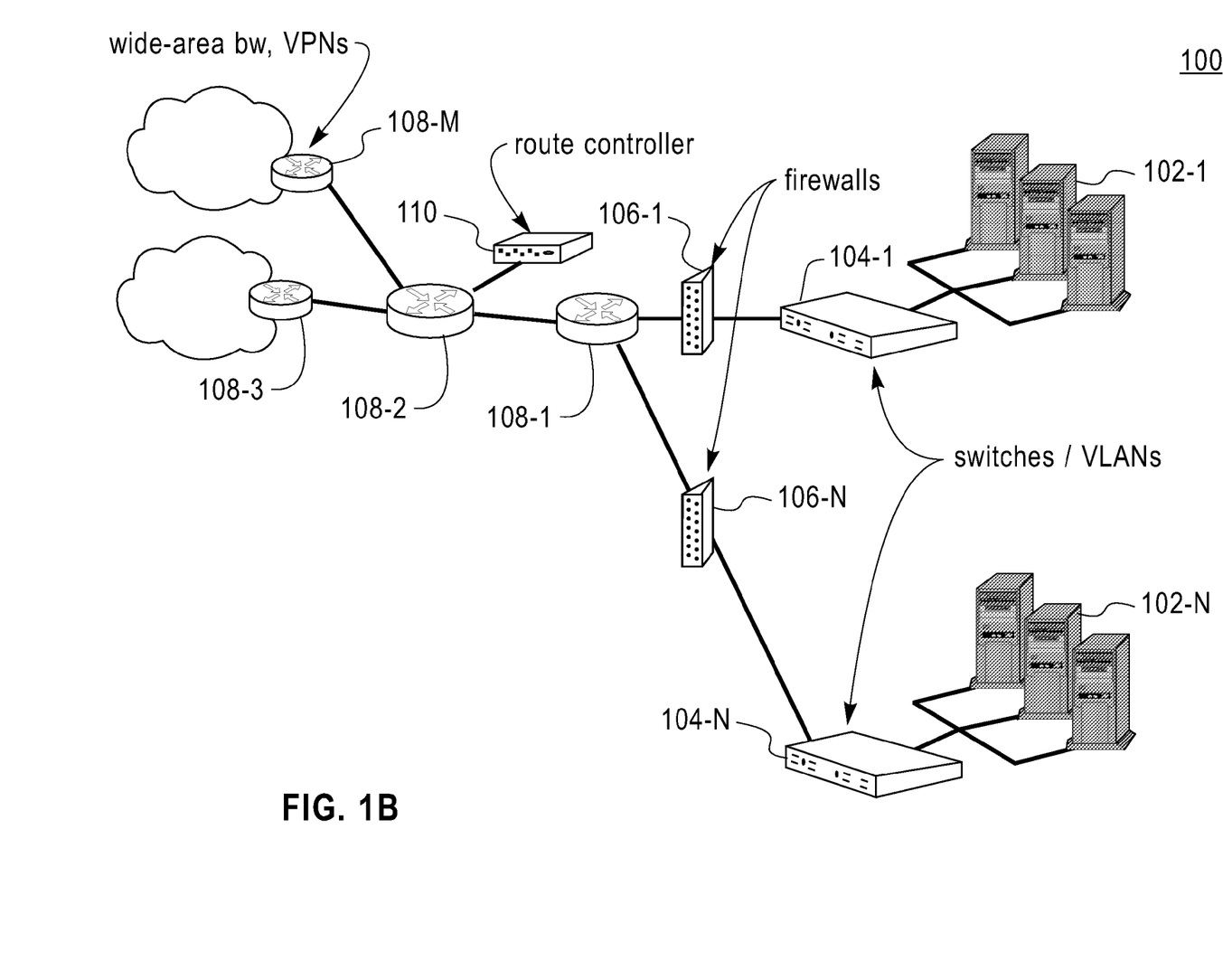
FIG. 1B illustrates network resources in an administrative domain of a distributed network environment in which principles of the invention may be implemented.

FIG. 1B illustrates that, in addition to server resources (server clusters 102-1 . . . 102-N), each administrative domain (100) has a number of network elements including, for example, a local area network (LAN) with switches (104-1 . . . 104-N), firewalls (106-1 . . . 106-N), virtual LANs (VLANs), and connectivity to a wide area network (WAN) with services such as virtual private networks (VPNs 108-1 . . . 108-M), route controllers (110), and quality-of-service (not expressly shown). Principles of the invention address the situation where local network resources are insufficient to ensure SLA compliance with respect to client demands.

An SLA generally specifies the required performance of the computational tasks (e.g., parallel or transactional grid application) running in the environment. Performance SLA metrics can be expressed, for example, in terms of transaction response time or throughput, or completion time of the jobs. In the U.S. Patent Application Publication No. 2005/0165925 disclosure, the SLA monitor observes the SLA metric of interest and when the required performance is not being provided, or a violation is imminent, the SLA monitor requests additional server resources locally, or remotely if local resources are not available.

In accordance with principles of the invention, an SLA is extended to include additional performance and availability metrics which are related to the network resources required. For example, if the application (either transactional or parallel) transfers large amounts of data, sufficient access and local bandwidth must be provisioned at each application site (e.g., grid site), and would be specified in the SLA. Similarly, if the application requires resiliency to network outages, the SLA may specify that multiple redundant links be used from different providers to ensure the required availability.

Note that the network SLA could apply to either the connectivity between grid sites (in case they need to exchange data as described above) or to the network characteristics of the connectivity from the application to clients accessing the application. The SLA (or related service specification) can also indicate a required security configuration that can be implemented in firewalls by a local or remote network resource provisioner. In accordance with principles of the invention, the SLA (or service specification) is used by an SLA monitor to decide when additional network resources need to be allocated, and how those resources should be provisioned (e.g., amount of bandwidth required, link diversity, security configuration, etc.). A network resource provisioner executes the step of allocating such network resources.

Thus, in accordance with principles of the invention, when the SLA monitor at a particular domain detects (or predicts) an SLA violation, it first tries to reallocate local server resources to meet the new workload demands. If additional servers can be allocated from the local domain, while still meeting the committed SLA, then they are appropriately provisioned by a server provisioning component. Such server provisioning component can operate as described in the U.S. Patent Application Publication No. 2005/0165925 disclosure.

In addition, a local network provisioner component may have to reconfigure to handle the new server allocation including, for example:

VLAN configuration change to add the ports of the new servers to the corresponding application VLAN;

add firewall rules if necessary to allow access to the new servers hosting the applications; and allocation of any additional access bandwidth needed to support the traffic to the new servers.

Thus, if sufficient resources are not available at the local domain, the SLA monitor can query and request additional server resources from a remote site. This would require the local domain to communicate a request for additional resources from the remote domain, including SLA requirements, utility/cost functions, etc. In accordance with principles of the invention, network resources may be similarly requested from the corresponding remote site by the local network provisioning component.

Figure 2:
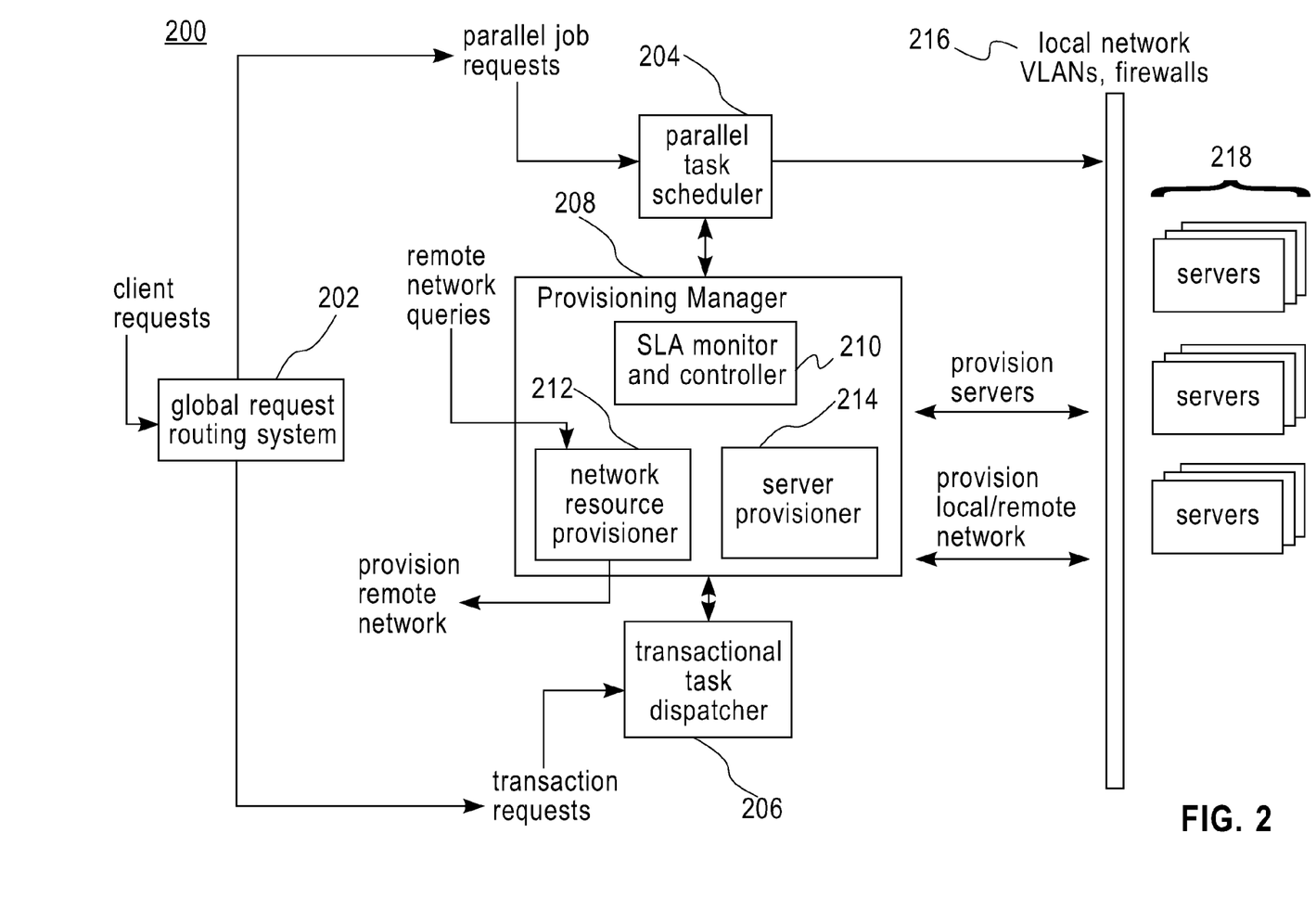
FIG. 2 illustrates a system for provisioning network resources across multiple domains according to an embodiment of the invention.

Turning now to FIG. 2, a system for network distribution and provisioning of applications, such as transactional applications and parallel applications, across multiple administrative domains that ensure compliance with SLAs is illustrated.

As shown, system 200 includes global request routing system 202, parallel task scheduler 204, transactional task dispatcher 206, provisioning manager 208, local network resources 216, and local server resources 218. Provisioning manager 208 includes service level agreement (SLA) monitor and controller 210, network resource provisioner module 212, and server provisioner module 214.

It is to be appreciated that each domain (e.g., local domain 14 and remote domains 16-1 through 16-N shown in FIG. 1A) in the network is preferably equipped with such a system.

Furthermore, it is to be understood that server provisioner module 214 is preferably implemented as the on-demand manager described in the U.S. Patent Application Publication No. 2005/0165925 disclosure. That is, server provisioner module 214 preferable includes the workloads, server planning and provisioning, and workload prediction components described above with regard to the on-demand manager. Thus, it is server provisioner module 214 that allocates server resources (i.e., server resources 218 and server resources at remote domains) across multiple domains based on whether the current or predicted workloads meet the specified SLA. However, it is to be understood that any suitable server provisioning component may be employed.

Further, it is to be understood that SLA monitor and controller 210 preferably serves as the component that monitors overall SLA compliance. That is, SLA monitor 210 serves the function of monitoring past, present and future (based on a prediction model) compliance of computational requirements (as was otherwise performed by the on-demand manager of the U.S. Patent Application Publication No. 2005/0165925 disclosure) and network requirements (as is now addressed by principles of the invention).

As mentioned above, resource allocation by server provisioner module 214 alone does not consider the need for network-aware allocation and the provisioning of network resources (i.e., network resources 216 and network resources at remote domains) in order to maintain SLA conformance. Advantageously, system 200 enables management of such network resources. This is accomplished at least in part by network resource provisioner 212.

Network resource provisioner 212 performs several functions. The module acts as the provisioner of local network resources in response to external provisioning requests (i.e., from one or more other domains requiring network resources to achieve SLA compliance), or local requests from SLA monitor 210. The module also performs local and site-to-site network monitoring and can request or provide information to remote sites (domains) about network statistics including network delay, available bandwidth, observed loss rates, etc. The module also interacts with global request routing system 202 to update request routing rules. While network resource provisioner 212 is shown as a single logical component in FIG. 2, it may include several sub-components each specializing in one of the above-described functions.

Global request routing system 202 distributes client requests to various sites according to where applications are operating, and what type of application with which the request is associated. Such a routing system may be implemented, for example, as a domain name service (DNS) server, a transport-layer connection router, or an application-level redirector. Depending on whether the request is associated with the execution of a parallel application that is being hosted by server resources 218 or a transactional application also being hosted by server resources 218, routing system 202 forwards a request to parallel task scheduler 204 (for parallel application requests) or transactional task dispatcher 206 (for transactional application requests). Scheduler 204 and dispatcher 206 direct the request to the appropriate server resources in accordance with server provisioner 214.

Figure 3:
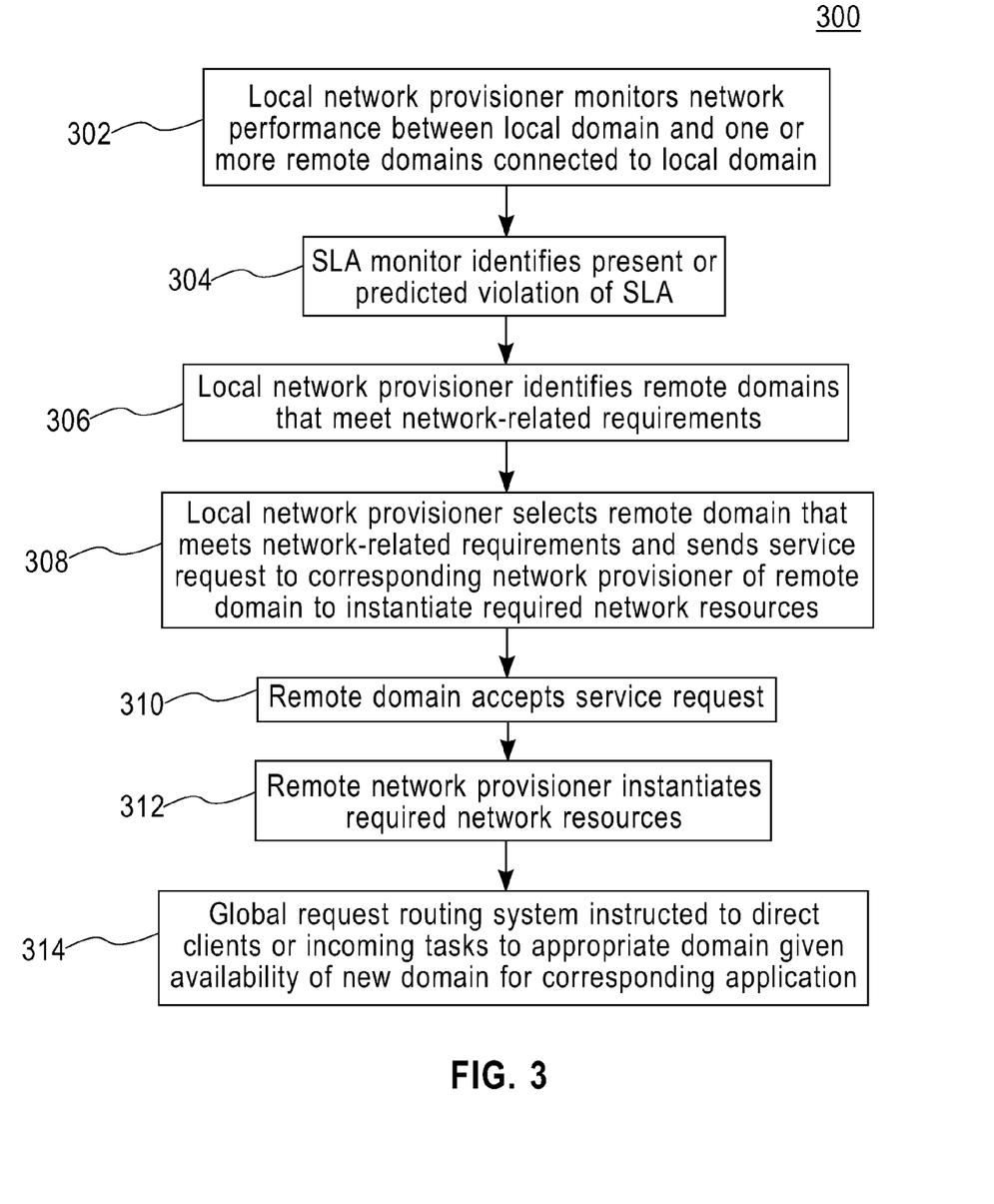
FIG. 3 illustrates a methodology for provisioning network resources across multiple domains according to an embodiment of the invention.

A methodology for provisioning network resources across multiple domains, according to principles of the invention, is shown in FIG. 3. It is to be understood that while the methodology shown in FIG. 3 represents provisioning of network resources, server resources may be provisioned as described above. As shown, network resource provisioning methodology 300 includes the following steps.

In step 302, local network resource provisioner 212 monitors network performance between a local service domain and one or more remote (cooperating) domains connected to the local domain by network paths. It is to be appreciated that monitoring is performed on an ongoing basis so that the network resource provisioner is able to choose candidate sites (see step 306 below) based on a number of criteria including, for example, path characteristics such as network bandwidth and latency.

In step 304, SLA monitor 210 identifies a present or predicted violation of the SLA based on information from the monitoring step.

In step 306, local network resource provisioner 212 identifies remote domains that meet network-related requirements (from the set identified by the SLA monitor), as defined in the SLA or service request. These may include the extent of diversity of connectivity to the WAN, the geographic or topological location of the remote domain, the amount of access and LAN bandwidth available at the remote domain, and the network performance between the local domain and the remote domain.

Ins step 308, local network resource provisioner 212 selects a remote domain that meets the network requirements and makes a service request to the corresponding network resource provisioner to instantiate the required network resources. The selection criteria can be based on the cost of resources at the remote domain, the ability of the remote domain to meet all requirements, or simply to use a domain selected by the SLA monitor. Some negotiation may occur between the SLA monitor and the network resource provisioner to select an appropriate remote domain.

In step 310, once a remote domain has been selected, the remote domain accepts the service request. Note that, alternatively, the remote domain may reject the request or make a counter-offer.

In step 312, the remote network resource provisioner instantiates or configures the required network resources at the remote domain. This may include the VLAN, firewall, and access bandwidth configuration as described above for the local network resource provisioner. It may also include establishment of paths (e.g., using Multi Protocol Label Switching (MPLS) VPNs) to the remote domain with sufficient performance to ensure that application instances (or parallel subtasks) can send updates, query local data, report results, and be dispatched, according to response time and other metrics.

In step 314, once the new domain has been configured and appropriately provisioned, global request routing system 202 is reprogrammed (instructed) to direct clients or incoming tasks to the appropriate domain given the availability of the new domain for the corresponding application.

To summarize, when the SLA monitor at a particular domain detects (or predicts) an SLA violation, it first tries to reallocate local server resources to meet the new workload demands. If additional servers can be allocated while still meeting the committed SLA, then they are appropriately provisioned by the server provisioning component. In addition, the local network will have to be reconfigured to handle the new server allocation. Typically, network traffic from different workloads and their corresponding applications are isolated using VLANs and firewalls to prevent traffic from one application from affecting another. This reconfiguration is performed by the network resource provisioner at the domain, which may reprogram VLANs on local network switches, and add rules to local firewalls to allow application traffic to reach newly allocated servers.

If sufficient resources are not available at the local domain (e.g., grid site), the server provisioner may query and request additional server resources from a remote site. This would require the local domain to communicate a request for additional resources from the remote domain, including SLA requirements, utility/cost functions, etc. Principles of the invention expands the SLA to also indicate a description of the network resources required, which would be in an agreed upon format (e.g., Extensible Markup Language (XML) or Web Services Description Language (WSDL) file with a specified schema). It may also express requirements on the communication between local and remote sites to ensure that application instances (or parallel subtasks) can send updates, query local data, report results, and be dispatched, according to response time and other metrics. The monitoring component of the network provisioner collects statistics such as site-to-site delay and loss, to help the SLA monitor choose candidate sites from which to request additional resources.

The network resource request may indicate, for example, a specified wide-area bandwidth or establishment of a VPN tunnel from the remote site to the local site to securely communicate application information. Those skilled in the art will readily appreciate that other types of network resources or services could also be specified. In a more cooperative environment, the network provisioner component at the local site could query the network resources and capabilities at the remote site using a service description interface (e.g., WSDL), and instantiate the required resources and network services directly if they are available. Note that a server (re)allocation at the remote site also requires the network provisioner at the remote site to reconfigure the site-local network (i.e., VLANs, firewalls, etc.) at the remote site.

Figure 4:
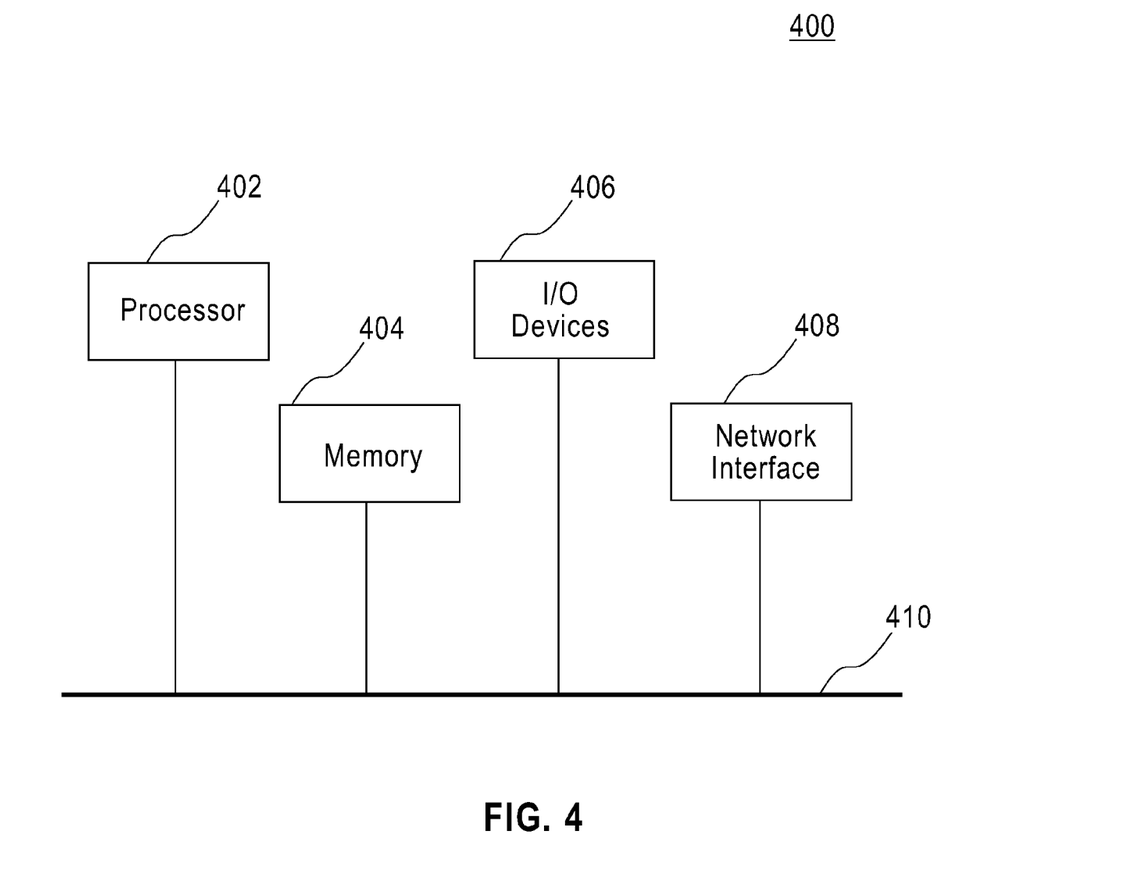
FIG. 4 illustrates a computer system in accordance with which one or more components/steps of a system for provisioning network resources across multiple domains may be implemented according to an embodiment of the invention.

FIG. 4 illustrates an illustrative hardware implementation of a computer system in accordance with which one or more components/steps of a system for provisioning network resources across multiple domains (e.g., components/steps described in the context of FIGS. 1A through 3) may be implemented, according to an embodiment of the present invention. For example, the illustrative architecture of FIG. 4 may be used in implementing one or more of the components shown in FIG. 2.

Further, it is to be understood that the individual components/steps may be implemented on one such computer system, or more preferably, on more than one such computer system. In the case of an implementation on a distributed system, the individual computer systems and/or devices may be connected via a suitable network, e.g., the Internet or World Wide Web. However, the system may be realized via private or local networks. The invention is not limited to any particular network.

As shown, the computer system 400 may be implemented in accordance with a processor 402, a memory 404, I/O devices 406, and a network interface 408, coupled via a computer bus 410 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of provisioning one or more resources in a distributed computing network to ensure compliance with a service level agreement associated with a computer application, the method comprising the steps of:

monitoring network performance between a local administrative domain and one or more cooperating administrative domains connected to the local administrative domain by network paths, wherein the local administrative domain and at least one or more of the cooperating administrative domains have a separate set of administrative policies by which resources of that administrative domain operate;

identifying a present or predicted violation of the service level agreement based on at least a portion of results of the monitoring step, wherein the service level agreement specifies performance and availability metrics for provisioning network resources required for network connectivity between multiple administrative domains and wherein the service level agreement specifies performance and availability metrics for provisioning network resources required for network connectivity between an application executing across the local and cooperating administrative domains and a client in the local administrative domain accessing the application;

selecting one or more cooperating administrative domains that can effect compliance with the service level agreement by instantiating one or more network resources within at least one of the selected cooperating administrative domains in response to a request from the local administrative domain, the one or more network resources being network elements that enable communication between computational resources of the distributed computing network, wherein the one or more network resources includes one of a network switch and a firewall; and causing reconfiguration of the local administrative domain to allow the computer application to make use of the one or more newly instantiated network resources within the selected cooperating administrative domain;

wherein the local administrative domain reconfiguring step further comprises instructing a request router to direct one or more client requests to the selected cooperating administrative domain; and wherein the computer application is one of a transactional application and a parallel application.

2. The method of claim 1, wherein the network performance monitoring step further comprises collecting information relating to at least one of a latency characteristic and a bandwidth characteristic associated with one of more of the network paths.

3. The method of claim 1, wherein the cooperating domain selection step further comprises querying one or more of the cooperating administrative domains to determine one or more available network resources.

4. The method of claim 1, wherein the local administrative domain reconfiguring step further comprises affecting a local area network configuration change.

5. The method of claim 1, wherein the local administrative domain reconfiguring step further comprises affecting a firewall rule change.

6. The method of claim 1, wherein the local administrative domain reconfiguring step further comprises affecting an access bandwidth change.

7. An apparatus for provisioning one or more resources in a distributed computing network to ensure compliance with a service level agreement associated with a computer application, the apparatus comprising:

a memory; and a processor coupled to the memory and operative to:

(i) monitor network performance between a local administrative domain and one or more cooperating administrative domains connected to the local administrative domain by network paths, wherein the local administrative domain and at least one or more of the cooperating administrative domains have a separate set of administrative policies by which resources of that administrative domain operate;

(ii) identify a present or predicted violation of the service level agreement based on at least a portion of results of the monitoring operation, wherein the service level agreement specifies performance and availability metrics for provisioning network resources required for network connectivity between multiple administrative domains and wherein the service level agreement specifies performance and availability metrics for provisioning network resources required for network connectivity between an application executing across the local and cooperating administrative domains and a client in the local administrative domain accessing the application;

(iii) select one or more cooperating administrative domains that can effect compliance with the service level agreement by instantiating one or more network resources within at least one of the selected cooperating administrative domains in response to a request from the local administrative domain, the one or more network resources being network elements that enable communication between computational resources of the distributed computing network, wherein the one or more network resources includes one of a network switch and a firewall; and (iv) cause reconfiguration of the local administrative domain to allow the computer application to make use of the one or more newly instantiated network resources within the selected cooperating administrative domain;

wherein the local administrative domain reconfiguring operation further comprises instructing a request router to direct one or more client requests to the selected cooperating administrative domain; and wherein the computer application is one of a transactional application and a parallel application.

8. The apparatus of claim 7, wherein the network performance monitoring operation further comprises collecting information relating to at least one of a latency characteristic and a bandwidth characteristic associated with one of more of the network paths.

9. The apparatus of claim 7, wherein the cooperating administrative domain selection operation further comprises querying one or more of the cooperating administrative domains to determine one or more available network resources.

10. The apparatus of claim 7, wherein the local administrative domain reconfiguring operation further comprises affecting a local area network configuration change.

11. The apparatus of claim 7, wherein the local administrative domain reconfiguring operation further comprises affecting a firewall rule change.

12. The apparatus of claim 7, wherein the local administrative domain reconfiguring operation further comprises affecting an access bandwidth change.

13. An article of manufacture for provisioning one or more resources in a distributed computing network to ensure compliance with a service level agreement associated with a computer application, comprising a non-transitory computer readable storage medium containing one or more programs which when executed implement the steps of:

monitoring network performance between a local administrative domain and one or more cooperating administrative domains connected to the local administrative domain by network paths, wherein the local administrative domain and at least one or more of the cooperating administrative domains have a separate set of administrative policies by which resources of that administrative domain operate;

identifying a present or predicted violation of the service level agreement based on at least a portion of results of the monitoring step, wherein the service level agreement specifies performance and availability metrics for provisioning network resources required for network connectivity between multiple administrative domains and wherein the service level agreement specifies performance and availability metrics for provisioning network resources required for network connectivity between an application executing across the local and cooperating administrative domains and a client in the local administrative domain accessing the application;

selecting one or more cooperating administrative domains that can effect compliance with the service level agreement by instantiating one or more network resources within at least one of the selected cooperating administrative domains in response to a request from the local administrative domain, the one or more network resources being network elements that enable communication between computational resources of the distributed computing network, wherein the one or more network resources includes one of a network switch and a firewall; and causing reconfiguration of the local administrative domain to allow the computer application to make use of the one or more newly instantiated network resources within the selected cooperating administrative domain;

wherein the local administrative domain reconfiguring operation further comprises instructing a request router to direct one or more client requests to the selected cooperating administrative domain; and wherein the computer application is one of a transactional application and a parallel application.

14. A system for provisioning one or more resources in a distributed computing network to ensure compliance with a service level agreement associated with a computer application, the system comprising:

a network resource provisioner;

a service level agreement monitor coupled to the network resource provisioner; and wherein at least one of the network resource provisioner and the service level agreement monitor comprises a processor;

wherein the network resource provisioner monitors network performance between a local administrative domain and one or more cooperating administrative domains connected to the local administrative domain by network paths, wherein the local administrative domain and at least one or more of the cooperating administrative domains have a separate set of administrative policies by which resources of that administrative domain operate, wherein the service level agreement monitor identifies a present or predicted violation of the service level agreement based on at least a portion of results of the monitoring performed by the network resource provisioner, wherein the service level agreement specifies performance and availability metrics for provisioning network resources required for network connectivity between multiple administrative domains and wherein the service level agreement specifies performance and availability metrics for provisioning network resources required for network connectivity between an application executing across the local and cooperating administrative domains and a client in the local administrative domain accessing the application, wherein the network resource provisioner selects one or more cooperating administrative domains that can effect compliance with the service level agreement by instantiating one or more network resources within at least one of the selected cooperating administrative domains in response to a request from the local administrative domain, and wherein the network resource provisioner causes reconfiguration of the local administrative domain to allow the computer application to make use of the one or more newly instantiated network resources within the selected cooperating administrative domain; and wherein the one or more network resources are network elements that enable communication between computational resources of the distributed computing network, wherein the one or more network resources includes one of a network switch and a firewall;

wherein the local administrative domain reconfiguring operation further comprises instructing a request router to direct one or more client requests to the selected cooperating administrative domain; and wherein the computer application is one of a transactional application and a parallel application.

15. The system of claim 14, wherein the local domain and the one or more cooperating administrative domains comprise distributed grid sites in a grid-based distributed computing network.

* * * * *